United States Patent [19]
Dreifus

[11] Patent Number: 4,575,621
[45] Date of Patent: Mar. 11, 1986

[54] PORTABLE ELECTRONIC TRANSACTION DEVICE AND SYSTEM THEREFOR

[75] Inventor: Henry N. Dreifus, Narberth, Pa.

[73] Assignee: Corpra Research, Inc., Rosemont, Pa.

[21] Appl. No.: 586,938

[22] Filed: Mar. 7, 1984

[51] Int. Cl.[4] .............................................. G06K 5/00
[52] U.S. Cl. ..................................... 235/380; 235/492
[58] Field of Search ...................... 235/473, 492, 380

[56] References Cited

U.S. PATENT DOCUMENTS

| | | | |
|---|---|---|---|
| 3,637,994 | 1/1972 | Ellingboe | 235/61.12 |
| 3,702,464 | 11/1972 | Castrucci | 340/173 |
| 3,814,841 | 6/1974 | Ulicki | 235/473 |
| 3,868,057 | 2/1975 | Chavez | 235/61.7 |
| 3,876,865 | 4/1975 | Bliss | 235/61.12 |
| 3,906,201 | 9/1975 | Housman | 235/492 |
| 3,906,460 | 9/1975 | Halpern | 340/172.5 |
| 3,934,122 | 1/1976 | Riccitelli | 235/61.7 |
| 3,971,916 | 7/1976 | Moreno | 235/61.7 |
| 4,001,550 | 1/1977 | Schatz | 235/61.7 |
| 4,092,524 | 5/1978 | Moreno | 235/419 |
| 4,102,493 | 7/1978 | Moreno | 235/419 |
| 4,138,058 | 2/1979 | Atalla | 235/473 |
| 4,211,919 | 7/1980 | Ugon | 235/487 |
| 4,277,837 | 7/1981 | Stuctiert | 235/379 |
| 4,341,951 | 7/1982 | Benton | 235/379 |
| 4,405,829 | 9/1983 | Rivest et al. | 178/22.1 |
| 4,423,319 | 12/1983 | Jacobsen | 235/472 |
| 4,454,414 | 6/1984 | Benton | 235/380 |
| 4,460,965 | 7/1984 | Trehn | 235/379 |

OTHER PUBLICATIONS

"Memory Cards: A New Concept in Personal Computing" by Mark Mills, Jan. 1984 issue of BYTE Magazine, pp. 154–168.

"Smart Credit Cards: The Answer to Cashless Shopping" by Stephen B. Weinstein, Feb. 1984 issue of IEEE Spectrum Magazine, pp. 43–49.

*Primary Examiner*—Harold I. Pitts
*Attorney, Agent, or Firm*—Caesar, Rivise, Bernstein & Cohen, Ltd.

[57] ABSTRACT

A portable electronic transaction device and a terminal therefor. The device comprises a central data processor, a fixed memory, an adaptable memory, optical means for transmitting and receiving information to and from the terminal and self-contained power source means, such as an on-board battery. The device is arranged to operate in either a stand-alone mode during which it monitors itself for abnormal conditions or in an operating mode during which it communicates with said terminal for the transmission of information therebetween. The device also includes cryptographic means for encrypting outgoing information and decrypting incoming information in accordance with cryptographic information stored in its memory. The cryptographic information is modified as a function of time by clock means in the device and/or a function of information transmitted to the device by the terminal or stored in the device. During the standby mode of operation the device monitors itself, whereas in its operational mode it communicates with the terminal. Power for the standy mode is provided, via the on-board battery. Power for the operation of the device in the operational mode is provided via photocells in the device which are arranged to receive light from lamp means in the terminal.

34 Claims, 10 Drawing Figures

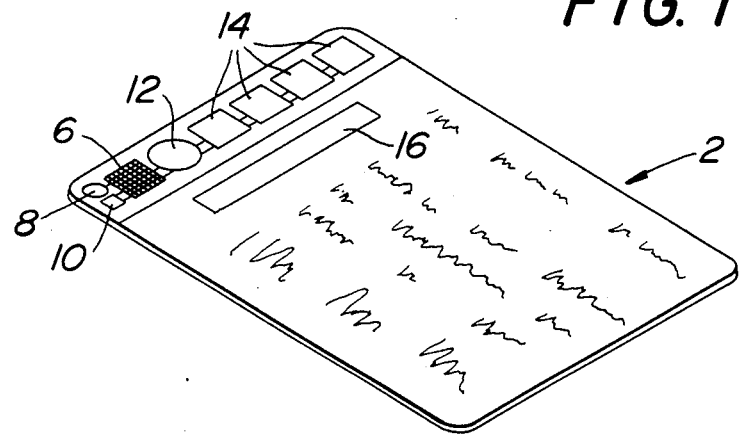
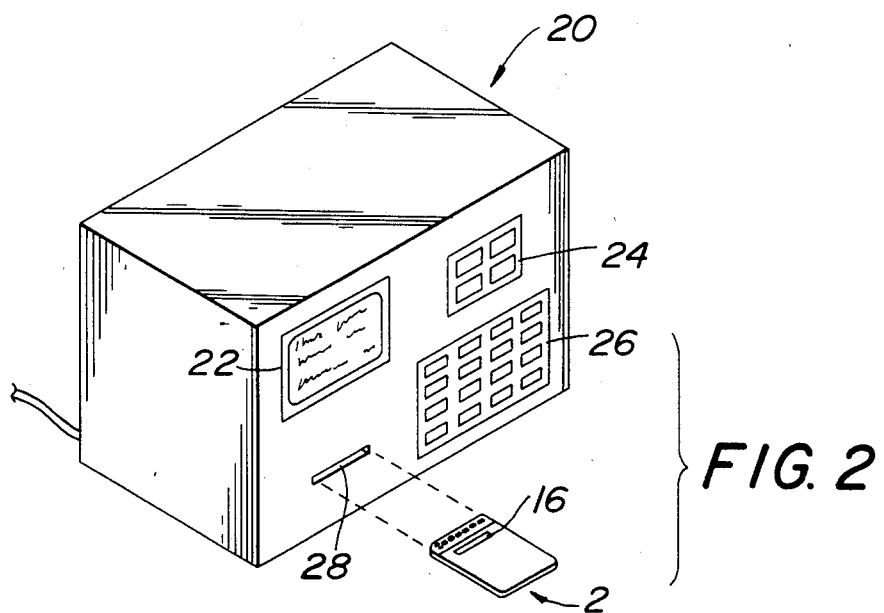

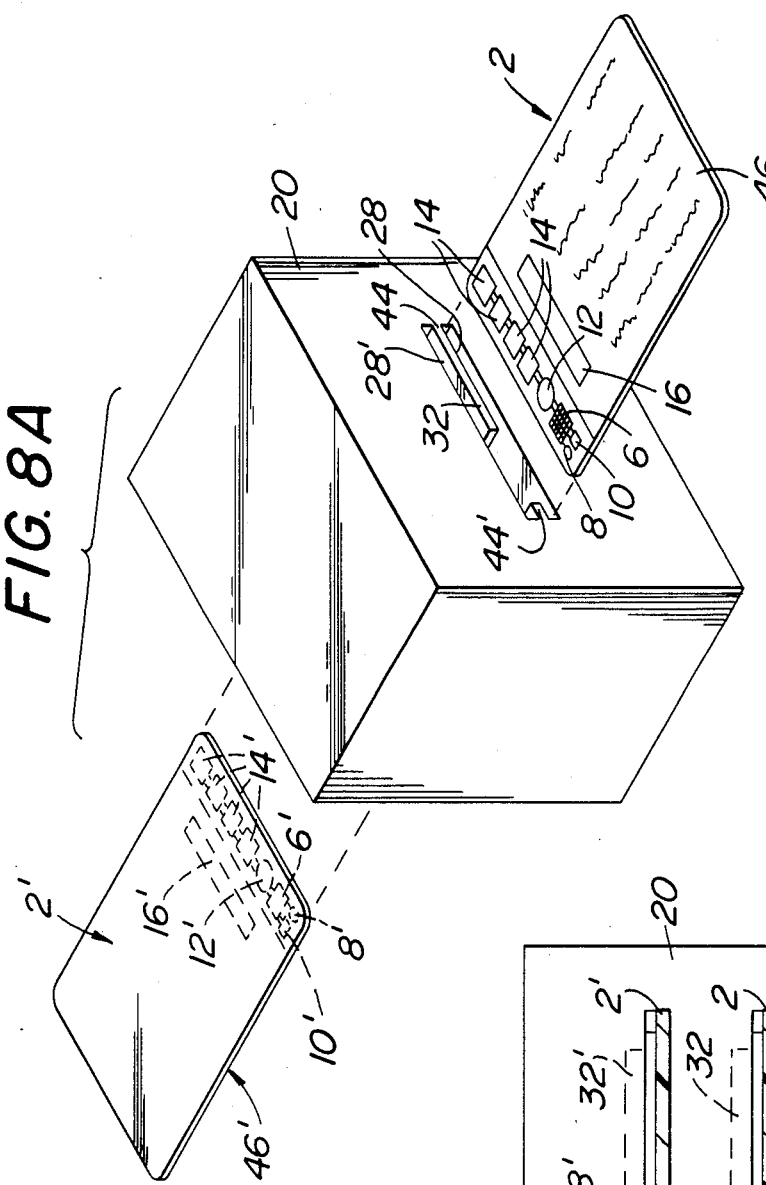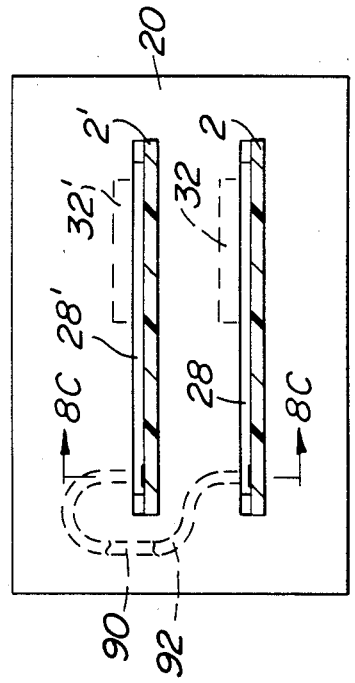

PORTABLE ELECTRONIC TRANSACTION DEVICE AND SYSTEM THEREFOR

BACKGROUND OF THE INVENTION

This invention relates generally to electronic transaction systems and, more particularly, to portable electronic transaction devices and associated terminals therefor.

Recent years have seen the rapid growth in the number and types of devices carried by the user and employed for credit card, location access, facility access, bank tellering or guard routing purposes. Such devices will hereinafter be referred to by the generic term "transaction devices" to signify the use of these devices as a means for effecting a transaction, such as a credit card sale, a bank deposit, access authorization, etc.

Prior art transaction devices have recently made use of a card or other compact structure for carrying information thereon and which is arranged to be inserted into a terminal to transfer information thereto. With the advent of micro-chip technology, some transaction devices have now incorporated electronic circuitry to store, transmit and receive various information such as identifier information, transaction and status information. Thus, the transaction device itself only forms one portion of what can be called a transaction system. That system can include various independent terminals, which may include their own intelligence (via the use of microcomputers therein) or may be interconnected to a remote or host computer (e.g., a main frame computer) via telephone lines or other data transmission equipment.

As is known, the availability and proliferation of low-cost, powerful microcomputers has resulted in increasing numbers of unauthorized intrusions into computer-based systems by criminals as well as pranksters. Thus, the newly developing transaction devices are susceptible to attacks on the security in the systems using them. For example, existing transaction devices frequently make use of mechanical, e.g., metal, contacts for connection to the terminal or system. While such means are simple in construction and relatively low in cost, they offer a readily accessible means for connection with an intruder's microcomputer to read the information in the transaction device or otherwise use it. Such action can be readily effected by cycling the microcomputer through various possible identifier codes to gain access to the system and its data. A further problem with transaction devices employing metal electrical contacts as the means for connection into the system is the tendency of such contacts to oxidize or be susceptible to physical damage. Either of these occurrences can reduce the reliability of electrical continuity and hence, data transfer.

Other prior art transaction devices have utilized capacitance means encapsulated in a card for the storage of information therein. Such capacitance-based devices are also susceptible to unauthorized access through the use of various means, such as capacitance bridges. Still other electronic transaction systems have made use of magnetic strips, such as on conventional plastic credit cards, for carrying information. Needless to say, the latter type of transaction device offers a very low degree of security inasmuch as the magnetically stored data can be readily read and duplicated with existing equipment.

A further security problem with prior art transaction devices is that they transmit information between the components of the entire system in an unencrypted or "clear" form, e.g., standard ASCII symbols, etc. The transmitted data, e.g., the bit stream, can therefore be easily read to determine identifier codes and other internal security information necessary for access to the system. Thus, once identifier codes, communication formats, and other system protocols are determined, the portable transaction device can be duplicated or forged, or the system can be entered at the terminal without a valid device.

Needless to say, the unauthorized or improper use of transaction systems can result in the losses of millions, if not billions, of dollars and serious breaches in high security systems.

An additional drawback of existing portable transaction devices is the fact that such devices do not have stand-alone capability. That is, they are constructed to be inactive (inoperative) when they are not connected in the system, e.g., not inserted in the terminal. Therefore, attempts at physical intrusion into the devices such as by delamination of the material encasing the device (e.g., "credit card" type), or inoperative conditions in the device as a result of an internal failure cannot be detected during the "off" or inactive period.

Examples of prior art transaction devices are shown in the following U.S. Pat. Nos. 3,637,994 (Ellingboe), 3,934,122 (Riccitelli), 3,702,464 (Castrucci), 3,868,057 (Chavez), 3,876,865 (Bliss), and 4,001,550 (Schatz) and 4,211,919 (Ugon). The aforegoing devices exhibit one or more of the characteristics as described heretofore, e.g., the employment of metallic electrical contacts, the use of clear (non-encrypted) communication and the failure to incorporate any stand-alone capability. U.S. Pat. No. 3,906,460 (Halper) discloses a transaction device using inductive coupling for communication, yet has no stand-alone, encryption or data processing capabilities. The devices disclosed in U.S. Pat. Nos. 3,971,916 (Moreno), 4,092,526 (Moreno), and 4,102,493 (Moreno), employ either mechanical or optical coupling for communications, thereby eliminating the problems inherent in the use of mechanical electrical contact. However, such devices have no stand-alone or encryption capability and are hence susceptible to intrusion.

Articles about credit card type transaction devices have recently appeared in the following publications: Byte magazine, January 1984, pages 154-168, and IEEE Spectrum, February 1984, pages 43-49.

OBJECTS OF THE INVENTION

Accordingly, it is the general object of the instant invention to provide a transaction device which overcomes the disadvantages of the prior art.

It is a further object of the instant invention to provide a portable electronic transaction device suitable for a wide range of applications.

It is a further object of the instant invention to provide a portable electronic transaction device which is physically and electrically insulated from the environment.

It is a further object of this invention to provide a portable electronic transaction device including an encryption/decryption system for communicating with an associated system.

It is still a further object of the instant invention to provide a portable electronic transaction device with stand-alone monitoring and intrusion detection capability.

It is still a further object of this invention to provide a portable electronic transaction device having a capability to continually or periodically vary encryption and encoding formats for enhanced security.

It is still a further object of the instant invention to provide a terminal which operates in conjunction with and provides a point of entry for an electronic portable transaction device.

It is still a further object of this invention to provide a terminal with entry access for two portable electronic transaction devices to allow the devices to transmit and receive information to and from each other.

SUMMARY OF THE INVENTION

A portable electronic transaction device for use in a transaction system having at least one terminal. The device is sealed in a container and comprises means for storing information therein, means for transmitting and receiving information to and from said terminal, internal, self-contained power source means, means for detecting abnormal conditions in the device and means for incapacitating the device in response thereto. The detecting means is powered by the internal power source means, whereupon the detecting means is operative at all times. When the device is incapacitated it cannot be used with the terminal. In accordance with one aspect of the invention, the device includes optical means for effecting the transmission and receipt of information to and from the terminal and cryptographic means for insuring that information transmitted between the device and the terminal is secure. To that end, the encryption of information is a function of clock information and/or information received from the terminal.

DESCRIPTION OF THE DRAWINGS

FIG. 1 is a perspective view of a portable electronic transaction device constructed in accordance with the instant invention and in the form of an encapsulated flat card similar in size and shape to a conventional credit card;

FIG. 2 is a perspective view of a terminal used in conjunction with the card of FIG. 1;

FIG. 8A is a perspective view of an alternative terminal and two portable electronic transaction devices of the instant invention for effecting the transfer of information from one such device to the other and vice versa;

FIG. 8B is an enlarged vertical sectional view taken through the terminal of FIG. 8A and showing the disposition of the two portable electronic transaction devices therein for the transfer of information therebetween.

DESCRIPTION OF THE PREFERRED EMBODIMENT

Figure 3:
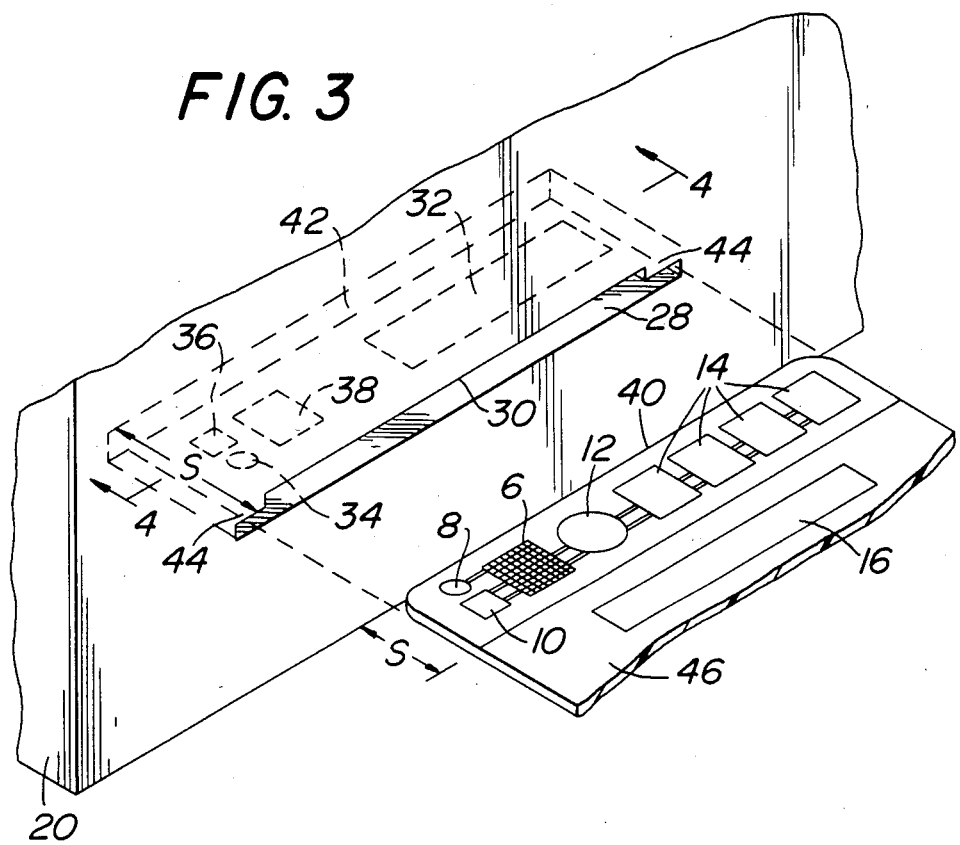
FIG. 3 is an enlarged, exploded perspective view of a portion of the terminal's slot and a portion of the card shown in FIG. 1.
Figure 4:
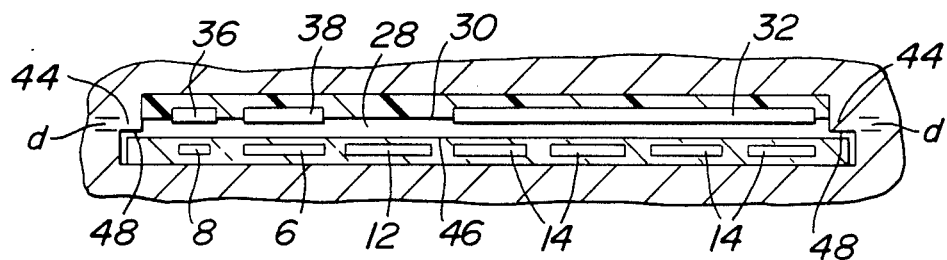
FIG. 4 is an enlarged sectional view taken along line 4—4 of FIG. 3.

Referring now in greater detail to the various figures of the drawing wherein like reference characters refer to like parts, there is shown a portable electronic transaction device 2 and an associated terminal 20 forming an electronic transaction system of the subject invention.

The details of the portable transaction device and the terminal will be described in detail later. Suffice for now to state that in the preferred embodiment the portable transaction device is an electronic device whose components are encapsulated in a plastic body in the form of a flat card, like a conventional plastic credit card. Thus, when referring to the device 2 hereinafter, the term "card" will be used. It must be pointed out however, that the device can take other physical forms than a card.

The card 2 includes a programmable data processor, a fixed memory to store various information such as, part of the operating system program, security information in the form of "keys" for a cryptographic system and identifier information, etc. The card also includes an adaptable memory for the storage of transaction data, (e.g., financial information, purchase information, etc.).

The card 2 is arranged to operate in either an operating mode (during which is coacts with a terminal, such as terminal 20) or in a stand-alone or standby mode. The latter type of operation is that which occurs when the card is not connected in the transaction system. It is during this mode that the card monitors itself to guard against intrusion or component failure. Thus, the card 2 includes a real-time clock and an interrupt control unit for effecting various "watchdog" functions when the card is in its standby mode.

The transfer of information between the card and the terminal is effected optically. In particular, information is transferred from the terminal to the card through the use of a light emitting diode(s) in the terminal and phototransistor(s) in the card, while the transfer of information from the card to the terminal is similarly effected, via the use of a light-emitting diode(s) in the card and a phototransistor(s) in the terminal. Thus, the card is arranged to be inserted into a slot in the terminal so that the phototransistor(s) of the card is aligned with the light-emitting diode(s) in the terminal and with the light-emitting diode(s) of the card aligned with the phototransistor(s) in the terminal so that bi-directional communication between the device and the terminal can occur.

As will be appreciated by those skilled in the art, the use of the optical means to effect communication between the card and terminal has the effect of obviating the problems inherent in prior art portable electronic transaction devices utilizing electrical contacts. Moreover, the encapsulation of the components in the card renders them physically, as well as electrically, insulated from the terminal as well as the environment, thereby increasing the card's resistance to impairment or degradation.

As stated earlier, the card 2 is arranged to operate in a stand-alone or standby mode. The power for the card when it is in its standby mode is supplied by an on-board battery. When in the standby mode, the card monitors itself, via its "watchdog" functions, provided by an interrupt control circuit therein. The interrupt control serves to monitor the card and disable it upon either the detection of physical intrusion into the card or the sensing of an inoperative or marginally operative condition in the circuitry of the card. Moreover, the interrupt control is arranged to switch the card from its standby or watchdog function to its active state. In its active state power is provided to the card, via the use of photocells in the card. Thus, when the card is inserted in a terminal and ready for use, e.g., when a signal is received by the card's phototransistor from the terminal and light produced by the terminal is received by the card's photocells, the interrupt control switches the card into the operational mode.

The card's microprocessor in conjunction with other components in the card, e.g., an encryption unit (to be described later), serves to encrypt and decrypt information which is transmitted to and received from the terminal. The "keys" for effecting the encryption-decryption process are stored in the card's fixed memory. In the interests of increased security the "keys" are arranged to be modified by the processor as a function of the real-time clock data and transaction data stored in the adaptable memory. Similarly, user identifier information is stored in the fixed memory and may be modified by the processor as a function of the clock data and transaction information stored in the adaptable memory. External information from the terminal may also be placed into the adaptable memory to change the operating system program, as desired.

Based on the program(s) within the card's memories, the data processor is arranged to calculate and maintain user profiles, based upon history of user transactions with the card. In such cases, aberrant user conduct can be detected by the transaction system and the system alerted to an unauthorized user in the case of loss or theft of the card.

Moreover, when the transaction system is in a security system, such as for providing access to secure facilities, unique individual characteristics such as retinal patterns, hand geometry or fingerprints, can be stored in the card for comparison to information obtained at the point of the transaction, e.g., the terminal or entry point of the card.

The data processing and storage capabilities of the card can be used for sales and marketing purposes as well as security. For example, discounts can be given to certain types of purchasers based upon the profile and data stored in the card. Moreover, credit limits can be altered as a function of the past transactions.

In accordance with a preferred embodiment of the transaction system the terminal includes a keyboard for use by the terminal operator. The keyboard enables the terminal operation to insert various information onto the system, e.g., insert user identification codes etc.

When a card is inserted into the terminal, the card transmits encrypted identifier or authentication codes and other information to the terminal. The terminal is arranged to decrypt the message and identifier information. The terminal then checks for correct corrolation between the user identifier code and the device's identifier information. The transaction information is displayed on a display at the terminal to insure that correct keyboard entry is made. Other information, such as credit balances, etc., may also be displayed, if desired.

As noted earlier and as will be appreciated by those skilled in the art, the transaction system can be configured for the use intended. Thus, the system can include a single terminal or a plurality of terminals which can communicate with each other or with a remote central computer. In the latter case, a modem is included in the terminal for effecting communication to the remote computer. The information flow between the terminal and the computer is asynchronous, with the terminal providing a temporary buffer storage for outgoing and incoming messages. Moreover, if desired, the terminal can be constructed to provide a "store and forward" capability to store messages from cards for a period of time and thereafter transmit them to the remote computer at some later time. As is the case with communications between the card and the terminal, all communications between the terminal and the remote computer is in encrypted form.

Other transaction systems of the subject invention may include terminals having sufficient built-in intelligence to operate directly with the card without the need for the use of a remote computer. In such a case the terminal itself is a stand-alone or "smart" terminal.

With the foregoing summary of the system in mind, the details of the card 2 and the terminal 20 will now be considered with reference to FIG. 1.

The card basically comprises an electronic, integrated circuit means 6, light emitting diode means 8, phototransistor means 10, battery means 12, photocells 14, and a liquid crystal display 16.

The circuit means 6 includes all of the components of the card necessary for the functioning of the card and will be described in detail with reference to FIG. 5. In accordance with a preferred embodiment of the invention circuit means 6 comprises a single VLSI (very large scale integrated) circuit chip in the interest of compact size.

The light emitting diode (LED) means 8 can be a single light emitting diode or an array of diodes, either connected in series, in parallel or in a series-parallel arrangement, for producing optical signals to carry information from the card to the terminal. The phototransistor means 10 can similarly be a single phototransistor or an array of either serial, parallel, or serial-parallel connected phototransistors for receiving optical signals from the terminal and for converting them to electrical signals for use by the card.

The liquid crystal display 16 serves to display information to the user of the card and the operation of the terminal.

As can be seen in FIG. 1, the card itself is of conventional credit card size and shape, that is approximately 85.5×54×0.8 mm and thus its body is formed of a plastic or other suitable material, with the components making up the operating portions of the device encapsulated therein. The plastic material making up the body of the card itself or portions of the card's body over the LED(s) 8, phototransistor(s) 10, photocells 14 and display 16 is preferably either translucent or transparent. Such a material is preferred so that the information may be transmitted and received by the light emitting diodes and phototransistors, power may be received by the photocells and the display 16 be readily visible, all without optical impediment.

The remainder of the body of the card may contain the features normally found on conventional credit or user access cards, such as embossed numbers and letters, an encapsulated photograph of the user, etc.

Referring now to FIG. 2, the details of an exemplary terminal 20 is shown. As can be seen, terminal 20 basically comprises a display 22, a set of controls 24 and a keyboard 26. The controls 24 provide for power and housekeeping functions, such as power on-off switches and indicator lamps. The keyboard can be any type, alpha/numeric, or numeric, and is used by the terminal operator to insert transaction information and an identifier code into the system.

Terminal 20 includes a slot 28 into which the card is inserted to perform a transaction and effect the transfer of information between the terminal and card and vice versa. Thus, in the embodiment shown herein the card will be described as a retail purchase credit card, and the terminal as a point-of-sale terminal. One "transaction" in such an application entails the sale of one or several items. As each item is "rung up" by the terminal operator, that is entered into the keyboard, the display 22 shows the identity of each item purchased and its price. This serves as a check of keyboard entry accuracy. The credit balance available to the user of the card 2 will be transmitted to the terminal during data transfer therebetween and may be displayed on the terminal display. Such information is based on information received by the terminal either from a remote computer, if the terminal is connected thereto, or from the information provided by the card itself.

If the card is used in another application than the retail point-of-sale application just described, the transaction would obviously have a different format. For example, when the card 2 is used as a guard route checking device, the "transaction" entails the detection and recording of the use of the card at a prescribed location along the guards route. The data and time of use of the card is also detected and recorded.

Referring now to FIG. 3 the details of the card receiving slot 28 of the terminal will now be described. Thus, as can be seen the upper wall 30 of the slot 28 includes a source of light 32, electronic integrated circuit means 38, phototransistor means 36 and light emitting diode means 34 all mounted therein. Those components are so located so that when the card is fully inserted in the slot 28 and its leading edge 40 makes contact with the slot's rear wall 42, the card's phototransistor(s) 10 is located directly beneath the LED(s) of the terminal 20 so that the optical signals transmitted from the LED(s) are received by the phototransistor(s) for conversion into electrical signals for use by the card's circuitry. Similarly, LED(s) 8 of the card 2 is located directly beneath the phototransistor(s) of the terminal 20 so that the optical signal transmitted by the LED(s) are received by the phototransistor(s) for conversion into electrical signals for use by the terminal's circuitry.

Any commercially available light emitting diodes and phototransistors operating in either the infrared spectrum or visible light spectrum are suitable for use in the subject system. The light source 32 for powering the card in its operational mode can be any conventional lamp and is located in the slot position directly over the card's photocells. The photocells convert the light received into electrical power for the card.

As can be seen the card's display means 16 is located on the card at a slightly inboard portion adjacent the end of the card so that it is fully visible when the card is inserted into the slot. This feature enables the user or terminal operator to read the card when it is in the terminal.

As can also be seen in FIG. 3 each side of the slot 28 includes a ledge 44. The ledges serve to properly position the card within the slot. In this connection the depth of each ledge is selected to insure proper distance between the light emitting diode(s) and phototransistor(s) of the card and terminal for proper signal transmission and reception and for proper distance between the light source 32 and the photocells for efficient power transmission. In particular, spacing of approximately 1 cm between the top surface 46 of the card 4 and the top wall 30 of the slot is desirable.

The circuitry of the terminal 20 will be described in detail later. Suffice for now to say that it includes the integrated circuit means 38 mentioned heretofore. This circuit means effects data processing by the terminal and in addition includes logic and interfacing circuitry (to be described later), to allow for the operation of the display 22, controls 24 and keyboard 26.

Figure 5:
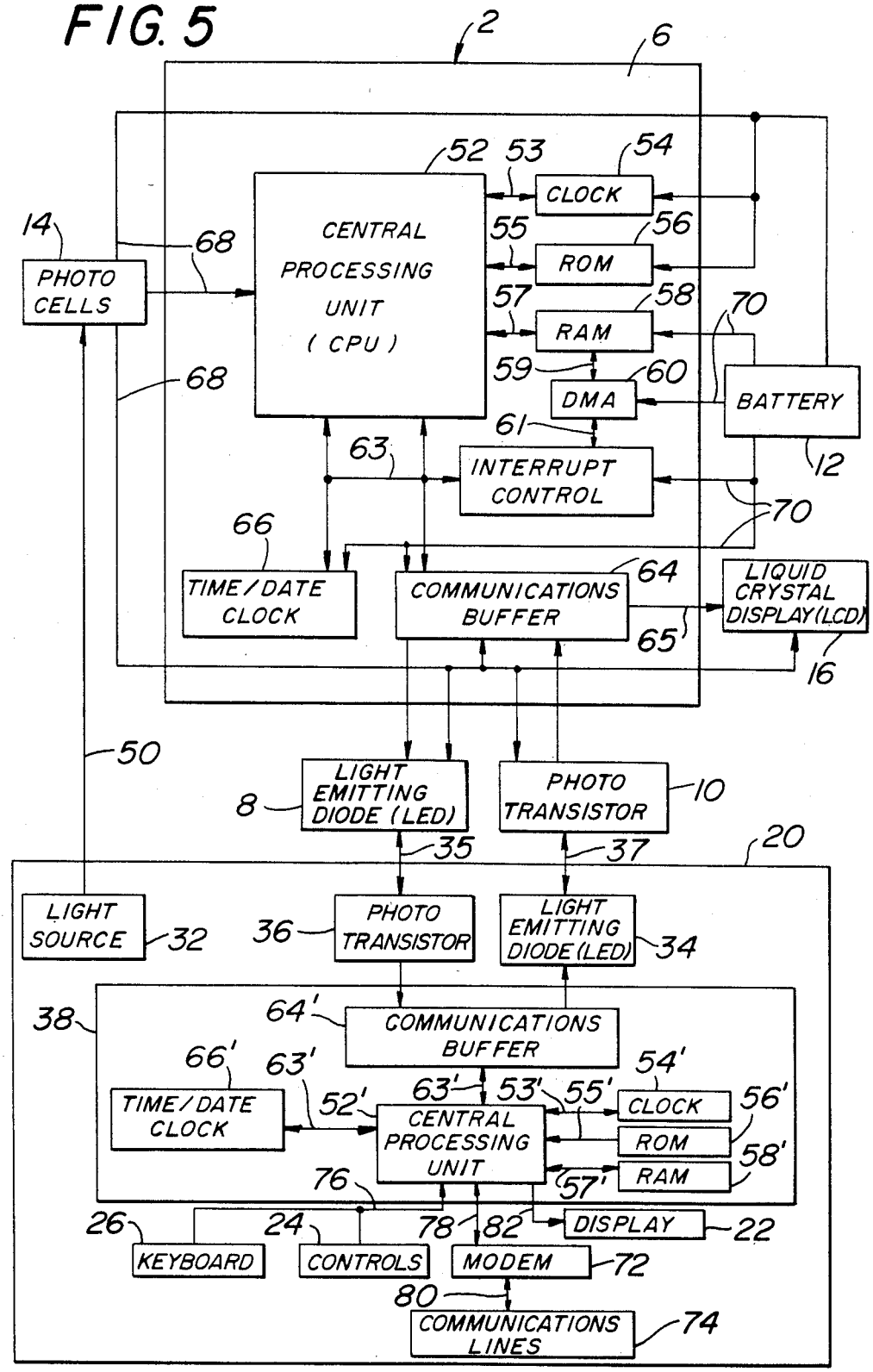
FIG. 5 is a block diagram of the portable electronic transaction device and associated terminal of the instant invention.

In FIG. 5 the block diagram of the components making up the card 2 and the terminal 20 are shown. In that diagram the flow of signal information is depicted by solid lines, while the flow of power is denoted by broken lines. As can be seen the integrated circuit 6 basically comprises central processing unit (CPU) 52, a high speed crystal oscillator or clock 54, a read only memory (ROM) 56, a random access memory (RAM) 58, direct memory access (DMA) circuitry 60, an interrupt control unit circuit 62, a communications buffer 64, and a time/date clock 66.

The CPU 52 is connected to clock 54, ROM 56, RAM 58, and interrupt control 62, via lines 53, 55, 57 and 63, respectively. Lines 63 also serve to connect the CPU to the time/date clock 66 and the communications buffer 64. The DMA 60 is connected to RAM 58 and the interrupt control 62, via lines 59 and 61, respectively. The communications buffer is connected to the liquid crystal display 16, via lines 65.

As will be appreciated by those skilled in the art, the photocells 14, when powered by the light source 32 from the terminal, provide electrical power, denoted by the dotted lines 68, to the CPU 52, the clock 54, the ROM 56, the display 16, the LED(s) 8 and the phototransistor(s) 10. Moreover, charging current is provided to battery 12 via mains (not shown).

When the card 2 is in its "stand alone" mode, that is when it is not inserted into terminal 20, the photocells are not activated and the battery 12 provides power to the RAM 58, direct memory access circuit 60, clock 54, interrupt control unit 62, communications buffer 84 and the time/date clock 66, via the lines depicted by the dotted lines 70.

In accordance with the preferred embodiment of the invention the battery 12 is a conventional 5-volt lithium battery having several hundred ampere-hours capacity. Such a battery is not only compact in size and light in weight but, utilized in a system like that disclosed herein, has an operating life of from 3½ to 4 years.

The central processing unit 52 provides all the logic, control and encryption functions for the system as will be described later. The clock 54 is a high speed clock which serves to provide timing and sequencing signals for the card. The ROM 56 is a fixed, that is unchangeable, read only memory which contains user identification information, encryption "keys" and a portion of the operating system program for the CPU 52. The RAM 58 is a random access memory which is arranged to accept and read out data during operations. In addition to storing intermediate data for the CPU'S logical operations, the RAM 58 also stores transaction data, time/date clock data and a portion of the operating program.

As described earlier and as shown in FIG. 5 the central processing unit CPU is connected to the clock 54, the ROM 56, the RAM 58, the time/date clock 66, the communications buffer 64 and the interrupt control circuit 62. Thus RAM 58 receives information from the CPU 52 and provides information to the CPU. Since the direct memory access (DMA) circuit 60 is connected to the RAM and to the interrupt control circuit 62 and since the interrupt control circuit is in turn connected to the time/date clock 66 and the communications buffer 64, DMA circuit 60 allows the RAM 58 to receive information directly from the time/date clock 66 and to transmit and receive the data from the terminal 20, via the communications buffer and the interrupt control unit 62, without relying on the operation of the central processing unit.

The data stored in RAM 58 is used to modify the operation of the CPU. Thus, the data stored is used either to modify the operating system program, or to vary the encryption keys and/or the user identification code stored in the ROM, depending upon the application for the system. In this regard, the operation of the card 2 can be changed during use by information inserted from external sources, such as the terminal, or by the time/date clock data and/or transaction data. This feature provides two levels of security interposed upon each other. For example, the user identification information can be encoded first and made part of an outgoing message, then the entire outgoing message may be encrypted to add further security. The encoding and encryption keys or format may be varied according to a predetermined protocol either stored in the memory of the card or received from the terminal. The card and terminal of the subject invention also provide a third level of security by the checking of "time windows" (to be described later) during authentication message transmission procedures.

As described earlier, the interrupt control unit 62 is arranged to enable the device to operate in either the stand-alone mode or the operating mode. In the stand-alone mode the card 2 operates independently of the terminal, with the photocells not being activated. In such a case the battery 12 supplies power to the card to maintain the information in RAM 58, to operate the time/date clock 66, the clock 54, the interrupt control unit 62 and the microprocessor 52. Moreover, the interrupt control 62 is arranged to monitor the conditions at various portions of the card. Such monitoring will be described later, but suffice for now to say that the interrupt control detects attempts to delaminate or physically intrude into the card while also sensing inoperative or marginally operative conditions of the card. In either event the interrupt control circuit 62 provides signals which can be used to erase data or modify or prevent entry of data into the card, thereby preventing further use of the card. The detailed operation of the interrupt control unit 62 will be explained later in conjunction with FIG. 6.

The communications buffer 64 provides the interface between the time/date clock 66, the CPU 52, the interrupt control unit 62, the liquid crystal display 16, the light emitting diode 8 and the phototransistor 10.

As can be seen in terminal 20 comprises the heretofore identified integrated circuit means 38, display 22, controls 24, keyboard 26, light source 32, light emitting diode(s) 34 and phototransistor(s) 36. In addition, the terminal also includes a modem 72 and a communications line 74. The circuit 38 is similar in construction to chip 6 described heretofore and thus includes communications buffer 64', a central processing unit 52', a clock 54', a ROM 56', a RAM 58', and a time/date clock 66' which are connected to one another in the similar manner as described heretofore. The keyboard 26 and controls are connected to the CPU 52', via lines 76. The modem is connected to CPU 52' and communications line 74, via lines 78 and 80, respectively. The CPU 52' is connected to display 22, via lines 82. Power for the components making up the terminal 20 is provided from a power source (not shown) connected to a conventional 60 Hz 115 volt power line.

In operation when a card 2 is inserted into the terminal, the terminal decrypts the message received from the card, decodes the card's identifier code and corrolates the card's identifier code with a stored user identifier code. If the message from the card was properly encrypted and the card's identifier codes are valid and correlate, the terminal allows communication from the card. Transaction information can then pass between the terminal and card. In addition, information can be sent to the remote computer by means of the modem 72 and the communication lines 74.

In the embodiment of the system shown herein there is disclosed a terminal and a card which are part of a system incorporating a plurality of terminals connected to a remote main frame computer, via communication lines from the terminals. Thus, each terminal need not include more on-board processing intelligence than necessary for initial validation, transaction data entry and communication buffering to the remote (main frame) computer. The main frame computer provides the authentication of files of transaction data and credit limit data for each user and the desired complex user profile calibrations, inventory control, sales statistics, and special security features.

Conversely, in some transaction systems it may be desired that some or all of the functions provided by a remote main frame computer be carried out by the terminal itself without any or much interaction with a remote computer. In such a case additional on-board processing intelligence is installed in the terminal. Means for authentication between the card and the terminal may be included in the terminal as well. Thus, in some systems with limited numbers of users the terminal operates with the card entirely independently of the remote computer, thereby obviating the need for a modem and communications lines in the terminal. One example of such a system is in systems providing access to a highly secured area for a limited number of valid users. In that system the "terminal" electronics would be installed along side an access door or gate. When the card is inserted in the slot, the terminal would itself provide validation, authentication, transaction data files, and sophisticated security functions, such as fingerprint, retinal patterns or hand geometry data storage and validation without the entry of data.

As noted earlier, the interrupt control circuit 62 performs three basic functions, namely, monitoring operational status of the card, detecting attempts at intrusion and switching the card's modes of operation, e.g., from stand alone mode to operating mode and vice versa.

The monitoring function is as follows: The interrupt control circuit monitors the operating conditions of the device at all times in both the stand alone and operating modes by checking for the presence and proper signal levels of the high speed clock 54 used by the CPU 52 operations. In addition, circuit 62 monitors the presence of proper signal levels of the time/date clock 66 and the presence of proper battery voltage. Finally, the circuit 62 checks for electrical continuity and leakage at various locations in the card. Thus, if the circuit 62 determines that the card is inoperable or marginally operable during its standby mode, the interrupt control circuit 62 disables the card (as will be described later) so that it can no longer be used with a terminal.

The second of the above-stated functions of the interrupt control circuit, that is to monitor the presence of physical intrusion, is effected continually in the stand alone mode. For example, if an attempt were made to delaminate a card to gain access to its interior, this would result in changes (e.g., breaks) in the electrical continuity of the card. Upon detection of such breaks or changes the interrupt circuit immediately effects changes in the card to prevent the intruder from gaining access to the information in the card and from using the card (as will be described later).

It must be pointed out at this juncture that the intrusion monitoring function of the control logic is not limited to use with portable transaction devices in the form of plastic cards. In this respect the intrusion monitoring can be applied to any type of portable electronic transaction device placed in a sealed container by detecting breaks in the continuity in the sealed portions thereof.

The third function of the interrupt control circuit 62, as noted above, switches the device between the "stand alone" and "operating" modes. In particular, when the card is inserted into the terminal 20 the phototransistor 10 receives optical signals from LED 34. The interrupt control circuit 20 detects the presence of these signals, checks for the presence of signals from clocks 54 and 66 and checks for the presence of a proper output level from the photocells 14. If all the checks are valid, the interrupt control circuit 62 switches the device from its "stand alone" mode to its "operating" mode. It is in the operating mode that the device is arranged to communicate with the terminal.

Figure 6:
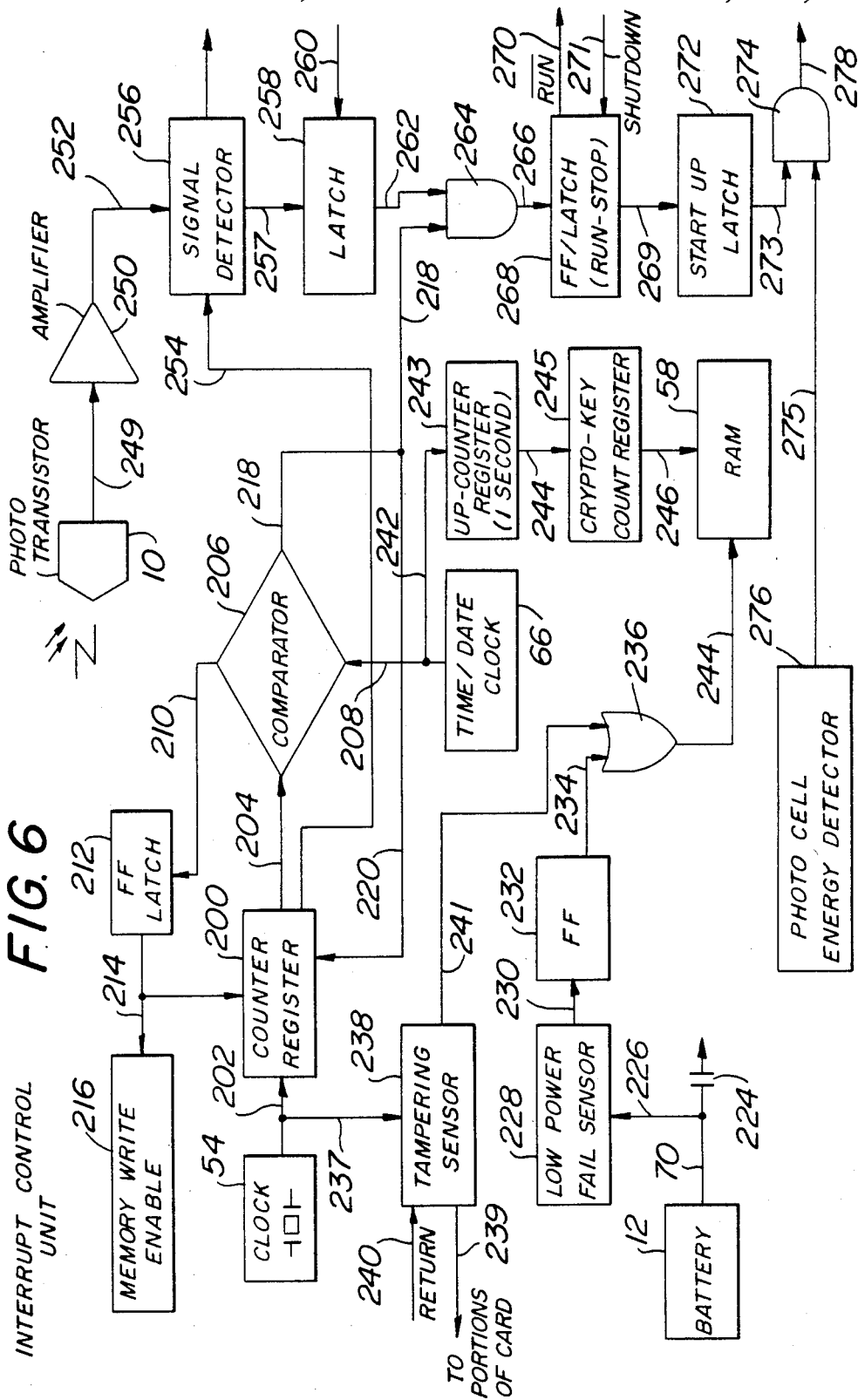
FIG. 6 is a logic diagram of the interrupt control portion of the portable electronic transaction device shown in FIG. 5.

Referring now to FIG. 6, the interrupt control circuit 62 will now be described. As can be seen, the clock 54 consists of a high speed crystal oscillator. The output of clock 54 is connected, via line 202, to a counter-register 200. The counter-register 200 counts the high speed clock pulses appearing on line 202 down to a 250 millisecond rate and includes a four stage register (an event counter) so that each second a pulse appears at its last stage. This stage is connected to line 204. Line 204 serves as one input to a comparator 206.

The time/date clock 66 provides continuous time/date information at a one second repetition rate and is preferably constructed similarly to the conventional integrated circuits used in digital watches. The output of clock 66 is connected to a line 208 which serves as another input of the comparator 206. The comparator 206 thus checks the presence of the one-second pulse stream from the time/date clock 66 as well as the one-second pulses produced from the counter register 200. If both one-second pulses are in phase, the comparator 206 provides an output pulse on line 218 which is connected, via line 220, back to the event counter of the counter register 200. This pulse serves to reset the event counter to zero so that it can commence connecting four, 250 millisecond pulses to once again generate a one-second pulse as an input to the comparator.

If either of the one-second pulses are not present, or are present and not in phase, a comparator 206 provides a signal at its output line 210. Output line 210 is connected to one input of a flip-flop latch 212. Accordingly, the signal appearing on line 210, and indicative of a condition wherein the one-second pulses are out of phase or not present, causes the flip-flop to change states, e.g., go low, and become latched in that state. The low output signal from the flip-flop is provided, via line 214, to the memory write enable 216 of RAM 58 to disable it and thereby prevent the writing of any information thereto. As can be seen, the line 214 from flip-flop 212 is also connected as an input to counter register 200. Thus, the low signal appearing on line 214 also serves to disable the four-event counter in counter register 200.

As stated earlier, the battery 12 supplies the standby power for the system. This battery power, in particular, is provided, via conductor 70 and capacitor 224 to the remaining portions of the card requiring power for standby operation. A low-power fail sensor circuit 228 is connected, via line 226 and line 223 to the battery 12 and is arranged to provide a signal on its output line 230 whenever the power from the battery drops below a predetermined value. This "low power signal" is provided, via line 230 to one input of a flip-flop 232. One output of the flip-flop 232 is provided, via line 234 to one input of a two-input OR gate 236. The other input of the OR gate 236 is provided, via line 241, from a tampering sensor 238. The tampering sensor is connected, via line 237, to the output of the high speed clock 54. The signals from the high speed clock are provided by sensor 238 to various portions of the components making up card 2 to check for electrical continuity. To that end, the sensor 238 receives the high speed clock signals back on line 240 and is arranged so that any change in those signals (which would occur in the event of tampering or physical damage to the card) is detected, whereupon the sensor provides a high signal on its output line 240. This output line serves as the second input to the OR gate 236. The output of the OR gate 236 is provided, via line 244, to RAM 58. Accordingly, if battery 12 fails or if its voltage decrease below a predetermined level, the sensor 226 detects that condition and provides a high signal on its output line 230. This high level causes the flip flop 232 to set, whereupon a high signal appears on the flip flop output line 234 to the OR gate 236. This action causes a high signal to appear on line 244. Line 244 is connected to RAM 58 to cause erasure of various information (e.g., crypto-key pointers) therein, as will be described later. In a similar manner if the tampering sensor detects tampering or a change in electrical continuity of the card the high signal appearing on line 241 to the OR gate is provided from the OR gate to the RAM to cause erasure of said information therein.

As can be seen, the output of the time/date clock 66 is not only connected to the comparator 206, but is also connected, via line 242, to an up-counter register 243. The output of the up-counter register 243 is connected, via line 244 to the input of a crypto-key count register 245. This register forms a portion of the encryption-decryption system of the card 4. The encryption-decryption system incorporates portions of the interrupt control as well as an encryption-decryption unit 86 forming a portion of the CPU (as will be described later). The use of the encryption-decryption system allows for the incorporation of a sophisticated encryption technique in the card and which offers a greater resistance to breakage than coding techniques used heretofore with portable transaction detecting devices.

To that end, the encryption/decryption unit 86 preferably utilizes the so-called "public key" system of cryptographic communication disclosed by Rivest et al in U.S. Pat. No. 4,405,829. The public key system utilizes two kinds of keys, namely, an encryption key and a decryption key. For each encryption key there is a decryption key. However, the decryption key is not the same as the encryption key. Moreover, while it is feasible to compute the encryption and decryption key, it is not feasible to compute the decryption key from the knowledge of the encryption key. In particular, the encryption or "public" key N is selected to be a product of two, secret, prime numbers (P and Q). The corresponding "secret" decryption key is computed from the two prime numbers using the non-secret formula $D = [2(P-1)(Q-1)+1]/3$.

To encrypt a message using this system a message is treated as one or plural blocks of numbers called "message blocks". To encrypt each message block, the block is cubed modulo N, where N is the "public" key. The resulting numbers represent the encrypted message block(s).

The encrypted message blocks are decrypted using the "secret" or "private" key. To that end, the decryption is effected by raising the encrypted message block to the power D, modulo N.

As will be appreciated by those skilled in the art using the public key system like that disclosed in U.S. Pat. No. 4,405,829, insures that the system of the subject invention is extremely secure from unauthorized access. Security may be further enhanced by employing digital signatures so that only authorized senders can use the system. The crypto-keys for the system are stored in ROM, with pointers to said keys being stored in RAM. These crypto-keys are erased whenever line 244 goes high. As described earlier line 244 goes high when either tampering is sensed by the tampering sensor 238 or low power or a power failure is sensed by sensor 228. The crypto-key pointers in RAM are stored at different address locations and serve to instruct the CPU as to the sequence and location of the bytes stored in ROM which are used to make up the crypto-key. Thus, by changing the sequence of reading the information from ROM 56 (via changing RAM pointers) or reading information from different locations in ROM 46 (via changing RAM pointers) the CPU can vary the crypto-key used to encrypt messages. The crypto-key pointers in RAM are modifiable in accordance with the subject invention, via information from the time/date clock 66. To that end the output signals from the time/date clock 66, indicating the existing date and time are provided, via line 239 to an up-counter register. This register advances a count each second. Thus, each second an output signal is provided from counter 243 to the crypto-key count register, via line 244. The crypto-key register provides crypto-key modifier information stored therein to the RAM to change the RAM pointers.

It must be pointed out at this juncture that while in the embodiment shown in FIG. 6 only the time/date clock data is used to modify the information in the crypto-key registers for the RAM pointers, transaction data or data received from the transaction system, via terminal 20, may also be used to modify the crypto-key registers. Moreover, the crypto-key information can be written directly to RAM or modified in RAM by the operation of direct memory access (DMA) circuit 60. In addition, the time/date clock data, transaction data or data received from the system may be used to vary the encoding of user identification data stored in the ROM 56, and such action may be accomplished using system hardware or can be accomplished through the use of appropriate software.

As noted earlier, the system of the subject invention is arranged to authenticate use, via "time window" encryption analysis. Thus, when the card is manufactured, it is tested and an expected time for the encryption of a standard message, such as a time/date message is measured. This encryption time depends on the encryption keys of the device and the physical makeup of the device. In addition, the terminal 20 or the host computer to which it is connected also have stored therein the minimum and maximum time for encryption of an authentication message. With the expected time for a standard message being between a minimum and maximum times. Thus, when the card is inserted in the terminal the terminal sends a message to the card and receives the same message back from the card but in encrypted form. By subtracting out the known two directional propagation time between the terminal/remote computer and the card, the terminal/remote computer can determine the time of encryption. If the time of encryption is outside of the expected time range, the terminal/remote computer will recognize that the card is a counterfeit or an unauthorized card and disable its use in the system.

As will be appreciated by those skilled in the art this technique precludes viable duplication of a card because even if the physical configuration of a card may be duplicated, its internal propagation delays for encryption of predetermined authentication messages could not be readily duplicated.

Referring now to the righthand portion of FIG. 6 the details of the control circuit 62 for switching from standby state to the operating state will be considered. Thus, when phototransistor 10 receives a signal from terminal 20, it provides a signal on its output line 249 to an amplifier 250. This amplifier serves to amplify the signal and provide it, via line 252, to a signal detector 256. The signal detector is a circuit which checks to see if there is a recognizable and intelligible signal on its input line 252. This action entails the detection of carrier modulated key information bits in 8-bit character groupings. The 250 millisecond pulses are provided, via input line 254 to establish the sampling rate of the signal detector for detecting the incoming signal. If the signal detector 256 determines that usable, recognizable signals are present on line 252, a pulse is provided by the signal detector on line 257. This pulse serves as an input to the latch 258 to cause the latch to provide a high signal on its output line 262. It should be noted that if the card 2 is in its operating mode, the latch 58 is disabled by a high signal appearing on its input line 260 from the CPU 52.

As can be seen output line 262 of the latch is connected to one input of a 2-input AND gate 264. The other input of AND gate 264 is connected, via line 218 to the output of the comparator 206. If pulses are present on line 218 and the latch 258 is latched, such pulses appear at the output of the AND gate 264 and are provided, via line 266 connected thereto, to a flip flop latch 268. Thus, when the first pulse appears on line 266 the flip flop-latch 268 switches to and its set (high) state. This high signal appears on line 269 as an input to a start-up latch 272. The start-up latch is connected as one input to a start-up AND gate 274. The other input to the AND gate 274 is provided, via line 275 from the photocell energy detector. Thus, in response to the high signal appearing on line 269 latch 272 provides a high signal on line 273 as one input to the AND gate 274. The photocell energy detector is arranged to provide a high signal on line 275 when it detects sufficient electromagnetic energy for powering the photocells 14. Thus, when the photocells receive sufficient energy from the terminal's lamp 32, line 275 goes high. When both line 273 and 275 are high, a high signal appears on line 278. This line is connected to the CPU and provides the start instruction to the CPU to cause the card to switch to its operating state.

Once the start signal appears on line 278 the CPU commences operation and communication between the terminal and the card and vice versa ensues. When the CPU has finished operating, that is, when the card is ready to go back to its standy mode, the CPU provides a shut-down signal, via line 271, to the flip flop latch 268. This causes the flip flop latch to switch to its reset state, whereupon a don't run ($\overline{RUN}$) acknowledgement signal appears on line 270 for receipt by the CPU. The reseting of of flip flop latch 268 also causes a low signal to appear on line 269. This low signal does not immediately appear on the input line 273 of AND gate 274 due to the propagation delay inherent in the start-up latch 272. In this regard, latch 272 provides a 1-gate propagation delay for the shut-down signal. This propagation delay ensures that the various signals throughout the card are received and operated upon before the card switches back to its standby mode. Once the line 273 goes low, gate 274 is disabled and thus a stop or low signal appears on line 278. When line 278 is low, the CPU 52 goes into its quiescent or stand-alone mode.

As should be appreciated from the foregoing, the start-up circuitry of the interrupt control unit 62 assures that recognizable signals must be present at the phototransistor, that both the high speed clock and the time/date clock are operating properly and that photocell energy is available from light source 32 in the terminal 20 prior to switching the device from its standby mode to its operating mode.

In summary, the interrupt control unit 62 disables operation in case of internal voltage failure or decreased voltage, loss of either the high speed clock or the time/date clock outputs or the detection of a loss of continuity or physical tampering. The detection of physical intrusion or loss of internal voltage immediately wipes out the crypto-key pointer information stored in RAM 58. Loss of either or both clocks disables the ability of the device to write into RAM 58, thus disabling the use of the device.

Figure 7:
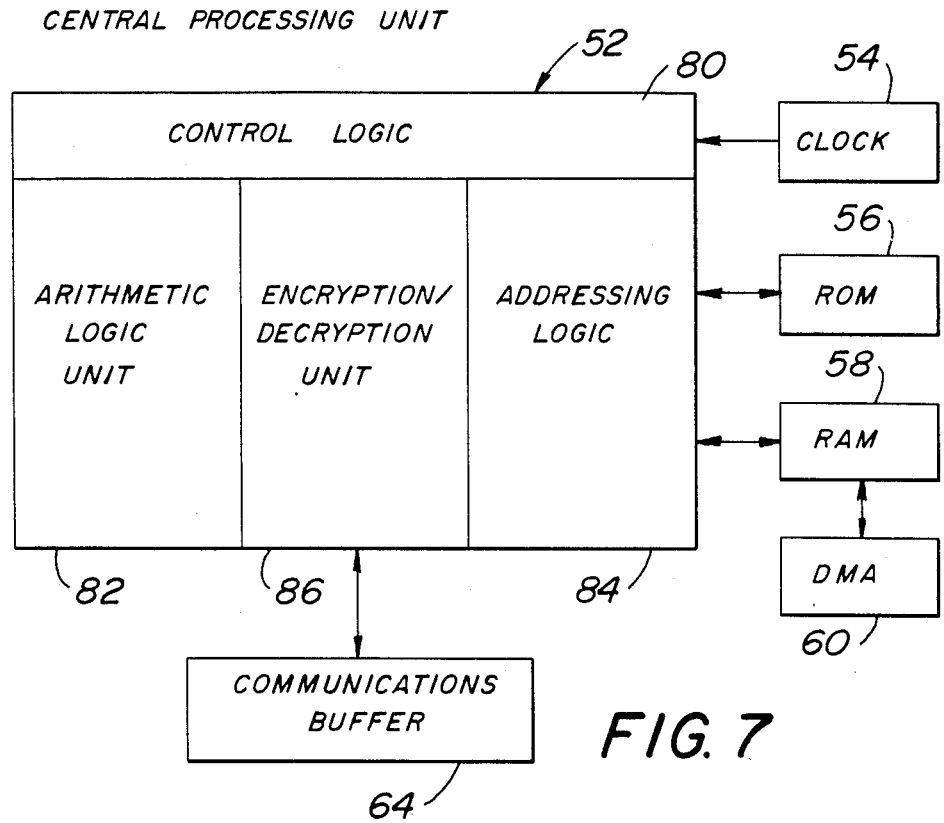
FIG. 7 is a block diagram of the central processing unit of the portable electronic transaction device.

Referring now to FIG. 7 a block diagram of the central processing unit will be described. As can be seen therein CPU 52 comprises control logic 80, arithmetic logic unit (ALU) 82, and addressing logic 84. The function of the control, arithmetic and addressing logic units of the CPU are well known to those familiar with the art and will not be discussed herein. The CPU 52 is provided with timing and sequencing signals from the master clock 54. The ROM 56 is a fixed memory storing a portion of the operating program, crypto-key information, and user identifier data, all of which are read into the CPU 52, via the addressing logic 84. The RAM 58 is a random access memory which has read/write capability and is accessed by the CPU, via the addressing logic 84. Moreover, as stated earlier, the RAM 58 can also be accessed by the terminal 20 and the time/date clock 66, via the direct memory access circuit 60. The RAM 58 serves to store the transaction data, the time/date clock data, and instructions for modification of the operating program, crypto-key and user identification data stored in the ROM 56.

Figure 8C:
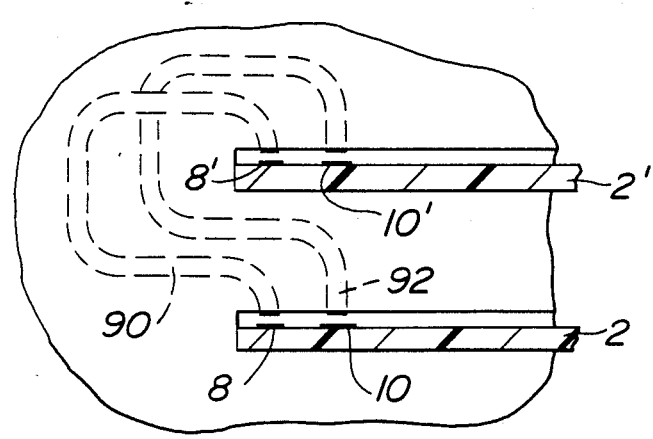
FIG. 8C is an enlarged sectional view taken along line 8C—8C of FIG. 8B.

In FIGS. 8A, 8B and 8C there is shown an alternative embodiment of the system of this invention. In that embodiment the terminal 20 is utilized in conjunction with a pair of cards 2 to allow the cards to communicate with each other, such as for transfering information therebetween.

Referring to FIG. 8A, it can be seen that terminal 20 includes a pair of slots 28 and 28' for receiving respectively a pair of cards 2 and 2'. Card 2' is identical in structure with card 2 and therefore all of its components are denoted with the "prime" designation. Card 2' is inserted in the slot 28' with its top surface 46' directed downward, whereas card 2 is inserted into slot 28 with its top surface 46 directed upward. Accordingly, the LED 8 of card 2 faces phototransistor 10' of card 2' for the transmittal of information therebetween. As can be seen, the slots include flanges 44 and 44'. These flanges properly position the card so that the distance between the cards is proper for the efficient transfer of information between the light emitting diode(s) and phototransistor(s) of the opposed cards. As stated earlier, a spacing of approximately 1 centimeter allows for efficient transfer.

The embodiment of the terminal shown in FIG. 8A can be used when one card is intended to replace another card and it is desired to transfer data from the old card to the new card prior to recall or destruction of the old card. Thus, transaction data from the ROM and RAM of the old card may be transferred to the RAM of the new card. In addition, information relating to user identification codes or crypto-keys can also be transferred. An alternative use to the system shown in FIG. 8A is to transfer data into one card to alter its program, user identification code or crypto-keys while intending to continue the use of the older card. In this respect the device's operation and stored data may be modified without resorting to communication lines or central processors.

An alternative embodiment for a terminal 22 to allow cards to communicate with each other is shown in FIG. 8B. In this embodiment one card is shown inserted into a slot 28 directly above card 4' which is inserted into slot 28'. The cards are not disposed so that the light emitting diode of one is disposed opposite the phototransistor of the other. Instead, fiber optic bundles 90 and 92 are provided within the terminal to carry the optical information between the two cards. Thus, as shown in FIG. 8C the fiber optic bundle 90 carries information from LED 8' to phototransistor 10, whereas fiberoptic bundle 92 carries information from LED 8 to phototransistor 10'.

The following elements represent standard, conventional components which can be used for various portions of the system shown herein.

| COMPONENT | SUPPLIER | PART |
| --- | --- | --- |
| CPU52,72 | National Semiconductor | 800 |
| ROM56,75 | National Semiconductor, Texas Instrument | 27C64 |
| RAM58,76 | National Semiconductor, Texas Instrument | 6264 |
| Communications | Intel | 6402 |

-continued

| COMPONENT | SUPPLIER | PART |
|---|---|---|
| Buffers 64 and 72 | | |
| Clocks 54, 74 | Exar | 5 Mhz crystal |
| LED 8 and 34 | General Electric | — |
| Phototransistors 10 and 36 | General Electric | — |
| LCD16 | AND | FE0601 |
| Terminal Display | AND | AND651 |
| Battery 12 | Panasonic, Hitachi | Custom lithium 5 volt |
| Logic Chips | National Semiconductor, Texas Instrument, Motorola | 7400-74374 |
| Photocells 14 | Panasonic, General Electric | |
| Modem 74 | Racal Vadic, American Telephone and Telegraph | assembled from standard chips |
| Liquid Crystal Display 16 | AND | AND651 |

Although the basic elements incorporated in electronic integrated circuit 6 and 38 may be supplied using commercially available elements for the CPU, ROM, RAM, communications buffer, DMA and interrupt control, as noted earlier, it is preferred that the elements be incorporated into a single custom integrated circuit (e.g., VLSI) chip in the interest of compactness of size and suitability for encapsulation in a flat card. If space limitations are not critical, commercially available individual chips may be used for the elements.

The light source 32 can be any commercially available incandescent bulb. To increase transmission efficiency, a suitable filter can be used to restrict transmission to a band best suited for selective photocells.

As will be appreciated from the foregoing, the invention provides a device and its associated terminal which is more secure against unauthorized acess and use and flexible in its applications than previously available transaction devices. By incorporating the feature of continuous stand-alone operation, the device of the subject invention provides self-checking and monitors against physical intrusion. It also continuously updates and changes device identifier information and format of incoming and outgoing encryption information to guard against forgery, duplication, or breaking of communication codes. The use of a dynamically programmable control data processor enables the use of sophisticated encryption techniques to prevent intrusion into the system. Moreover, the system can be used to store and compare hand structure, retinal patterns or fingerprints with those of the user. Additionally, user history information can be calculated and stored to detect abnormal buying or usage patterns in case of loss, theft or forgery of the device.

Individual user identification codes may be keyed in at the point of entry by the user to prevent the use of stolen or lost cards. Rather than having a fixed code for each individual user, the code can be varied by use of the display on the device. Moreover, the device may be programmed to include the capability to cause it to self-destruct in the case of a predetermined number of unsuccessful attempts to enter the system.

The use of the optical methods of signal transmission and of power transmission to the device eliminates production problems associated with the use of metal contacts, such as bonding metal to plastic material. In addition, the optical techniques eliminate the problem of metallic contact alignment, contact wear, corrosion and incomplete or noisy connections. Moreover, the optical transmission of signal information and power renders the device more difficult for connection to conventional computing devices used to scan the card for examination of its identity code or authorized user codes.

It must be pointed out at this juncture that while the description of the device heretofore has primarily been in the context of a transaction device embedded in a flat card and used for "credit card" type transactions, it is clear that this invention may be used for many other purposes such as location user access, automatic bank tellering, facility user access, guard keying, telephone access and billings, casino tokens, etc. Thus, for location user access a slot alongside the door or gate is used in conjunction with the device to rather than using the terminal 20. Hand geometry patterns, with the user's hand geometry stored in the card is used to prevent authorized entry. Similarly, retinal patterns or fingerprint information of the user can be stored in the card and checked for prior entry. In addition, coded information known only to each user can be keyed into the card to further protect against unauthorized entry. Upon the proper, authorized insertion of the user card a locking mechanism in the door gate is disengaged to permit entry.

A further use of the device is as a guard key which provides inputs into receiving devices located at points on the itinerary of guards on patrol. Here the transaction device can be embedded as a flat card, described heretofore, or placed on a key or other object of another desired shape or form. The transaction device could store the location and time of presence of the guard as he or she patrols and gives an alarm if out-of-order entries are detected. Rather than using a terminal as described above for receiving the device, a card slot or key slot can be used with the electronic circuitry installed behind or alongside the slot. Information known only to the guard can be keyed in at each location and if incorrect information is entered, a silent alarm is generated.

The device may also be used as a facility user device to permit access to various pieces of equipment. In this regard, remote terminals connected to communication and computing equipment can incorporate an entry slot for the device of the subject invention to permit access to those facilities. Similarly, access to automatic tellers, vending machines, computer terminals, secure data bases, and telephones can be controlled by the devices of the subject invention and using the device to automatically record the transactions thereon.

The device can also be embedded into a gambling chip or token to be used as a casino credit device. In such applications the user is given a credit amount and his own user code. At the gaming tables, the chip is inserted into a slot, with the display showing credit balance and a keyboard for entry of the user confidential code and transaction information. The credit balance is then recorded in the card.

The above are but a few examples of the possible uses of the device which are apparent from the above description and which renders the device of extremely wide utility.

Without further elaboration the foregoing will so fully illustrate my invention that others may, by applying current or future knowledge, readily adapt the same for use under various conditions of service.

I claim:

1. A portable electronic transaction device for use in a system having a terminal, said device being sealed in a container and comprising means for storing information therein, means for transmitting and receiving information to and from said terminal, internal, self-contained, power source means, sensing means for detecting abnormal conditions in said device, said sensing means being powered by said internal power source means and operated at all times, and means for permanently incapacitating said device in response to detection of abnormal conditions in said device by said sensor means, whereupon said device is precluded from use with said terminal.

2. The device of claim 1 wherein said sensor means comprises means for detecting physical intrusion into said container.

3. The device of claim 1 wherein said sensor means comprises means for monitoring the operating conditions of said device, said incapacitating means incapacitating said device in response to sensed inoperable or marginally operable conditions by said sensing means.

4. The device of claim 2 wherein said sensor means comprises means for monitoring the operating conditions of said device, said incapacitating means incapacitating said device in response to sensed inoperable or marginally operable conditions by said sensing means.

5. The device of claim 1 wherein the means for transmitting and receiving information to and from said terminal comprises optical means.

6. The device of claim 5 wherein said device is encapsulated in a material including a portion permitting optical signals to pass therethrough to and from said means for transmitting and receiving information in said card.

7. The device of claim 1 wherein said means for storing information comprises memory means.

8. The device of claim 7 wherein said memory means stores identifier information and crypto-information, said device also comprising means for encrypting the outgoing information and decrypting incoming information in accordance with said crypto-information.

9. The device of claim 8 wherein said device additionally comprises means for storing modifier information and wherein said crypto-information is modified as a function of said modifier information.

10. The device of claim 9 wherein said device includes clock means powered by said power source means, said clock means serving to vary said modifier information.

11. The device of claim 9 wherein said modifier information is a function of information received from said terminal or stored in said device.

12. The device of claim 5 wherein said optical means comprises light emitting diode means for transmitting signals from said device to said terminal and phototransistor means for receiving optical signals from said terminal to said device.

13. The device of claim 1 additionally comprising computer means cooperating with said other means for controlling the operation of said device.

14. The device of claim 6 wherein said container comprises a flat card.

15. The device of claim 14 wherein said flat card is formed of a plastic and having translucent portions for the passing of optical signals therethrough.

16. The device of claim 5 additionally comprising main power source means in said device and arranged to receive light from said terminal to power said device.

17. A portable electronic transaction device for use in a system including a terminal, said device comprising data processing means, memory means, means for transmitting and receiving information to and from said terminal, power source means for receiving power from said terminal to enable said device to communicate with said terminal and self-contained, internal power source means to enable operation of said device when said device is not used with said terminal, and interrupt control means powered by said power source and independent of said data processing means for enabling the operation of said device either independently of said terminal or in conjunction with said terminal.

18. The device of claim 17 wherein said interrupt control means comprises means for detecting abnormal conditions in said device when said device is not cooperating with said terminal and means for incapacitating said device in response to the detection of an abnormal condition, whereupon said device is precluded for use with said terminal.

19. The device of claim 18 wherein said means for detecting abnormal conditions includes means for sensing physical intrusion into said device.

20. The device of claim 18 wherein said means for detecting abnormal conditions comprises means for detecting inoperable or marginally operable conditions in said device.

21. A portable electronic transaction device for use in a system including a terminal, said device including data processing means, fixed memory means, adaptable memory means, means for transmitting and receiving information to and from said terminal, means for receiving power transmitted optically from said terminal, a self-contained, internal power source means to enable operation of said device independently of outside power sources and to maintain information stored in said adaptable memory, control means and operative independently of said data processing means powered by internal power source for enabling operation of said device in either a stand-alone mode or an operating mode, said operating mode enabling the transmission and receipt of information to and from said terminal, said stand-alone mode consisting of operation independent of said terminal and wherein said device monitors itself for abnormal conditions.

22. The device of claim 21 wherein said device further includes clock means operating continuously and powered by said internal power source means.

23. The device of claim 22 wherein said data processing means comprises a central data processor, said fixed memory means stores information including a portion of an operating program for said central data processor and identifier information, said adaptable memory means stores information including a second portion of said operating program, the output of said clock means and information relating to usage of said device as provided from said terminal, and wherein said data processor encodes said identifier information as a function of said clock and transaction information.

24. The device of claim 22 wherein said data processing means comprises a central data processor including means for encryption of information for transmission to said terminal, said fixed memory means storing information including a portion of the operating program of said data processor, identifier information and cryptographic information, said adaptable memory storing information including a second portion of said operating program of said data processor, the output of said clock means, and information relating to the usage of said device, said latter information being provided by said terminal, said data processor modifying said encryption information as a function of said clock output.

25. The device of claim 24 wherein said data processor modifies said encryption information as a function of said information received from said terminal.

26. The device of claim 23 wherein said device further comprises direct memory access means for permitting said clock means to directly access said memory means.

27. The device of claim 25 wherein said device comprises direct memory access means which permits said terminal information to be provided directly to said memory means.

28. A terminal for use with a portable electronic transaction device, said terminal comprising means for receiving said device therein, optical means for transmitting and receiving information to and from said device without electrical contact therebetween, means for transmitting power to said device, and means for decrypting encrypted information received from said device and for encrypting information transmitted to said device.

29. The terminal of claim 28 wherein said terminal includes memory means and wherein said encryption and decryption is performed by said terminal is a function of crypto-information stored in said memory means.

30. The terminal of claim 29 additionally comprising clock means and means for modifying said crypto-information as a function of the output of said clock means.

31. The terminal of claim 30 wherein said crypto-information is modified as a function of information received from said device or stored in said device.

32. The terminal of claim 28 wherein said terminal additionally comprises means for transmitting and receiving information to and from a remote computer.

33. The terminal of claim 28 additionally comprising means for receipt of a second portable electronic transaction device and optical means for enabling said devices to transfer information between each other.

34. The device of claim 33 wherein said means for enabling said devices to transmit and receive information between each other comprise fiber optic means.

* * * * *